C. F. STOCK, Dec'd.
N. G. MOORE, Administrator. Said C. F. STOCK Assignor of one-half to the ISAAC WALKER HARDWARE COMPANY.
BALL TRAP.
No. 10,867. Reissued Sept. 13, 1887.
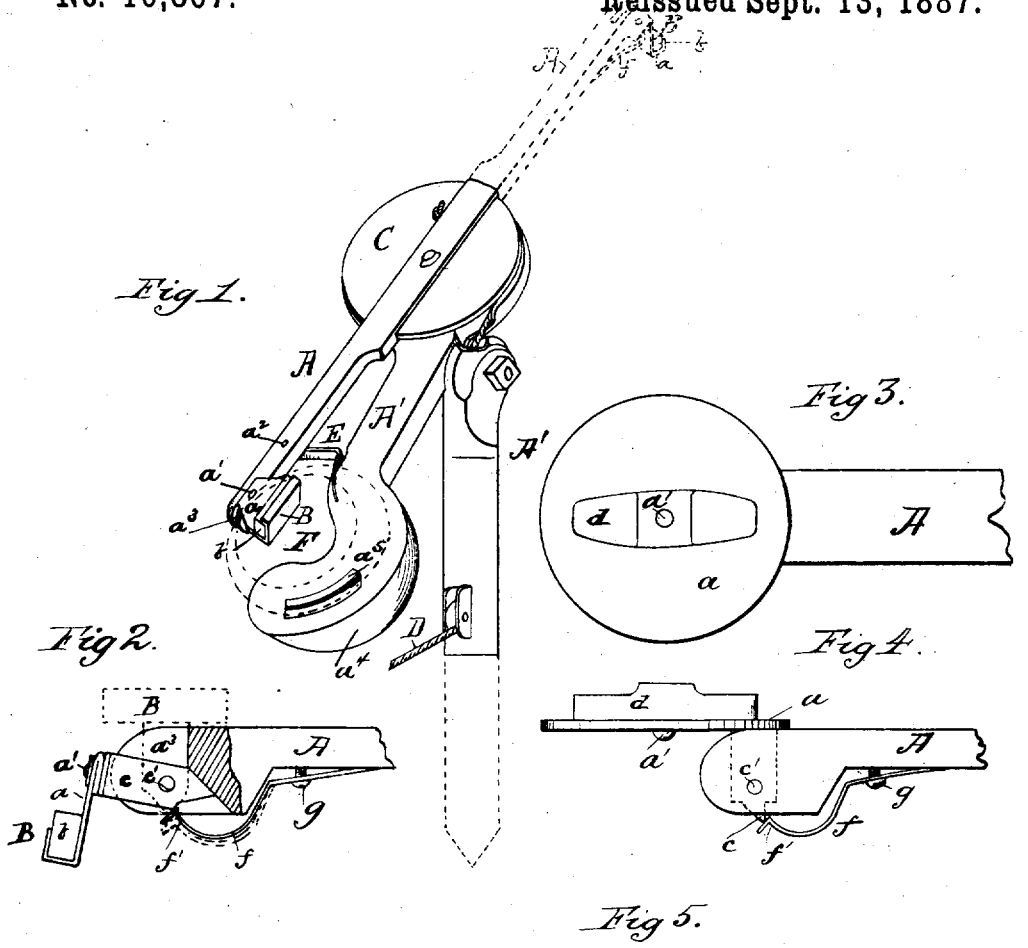
Witnesses:
Lew. G. Curtis
Mason Bros.
Inventor:
N. Grier Moore, Administrator of the estate of Charles F. Stock, deceased.
By Taylor & Brown
his Attorney.
THE NORRIS PETERS CO., PHOTO-LITHO., WASHINGTON, D. C.

UNITED STATES PATENT OFFICE.

N. GRIER MOORE, OF PEORIA, ILLINOIS, ADMINISTRATOR OF THE ESTATE OF CHARLES F. STOCK, DECEASED; SAID STOCK ASSIGNOR OF ONE-HALF TO THE ISAAC WALKER HARDWARE COMPANY, OF SAME PLACE.

BALL-TRAP.

SPECIFICATION forming part of Reissued Letters Patent No. 10,867, dated September 13, 1887.

Original No. 295,302, dated March 18, 1884. Application for reissue filed March 27, 1885. Serial No. 160,515.

*To all whom it may concern:*

Be it known that CHARLES F. STOCK, deceased, late a resident of Peoria, in the county of Peoria and the State of Illinois, did invent a new and useful Device for Throwing Targets; and I, N. GRIER MOORE, administrator of the estate of said CHARLES F. STOCK, do hereby declare that the following is a full, clear, and exact description thereof.

This invention relates to that class of target-throwing devices known as "clay-pigeon and ball traps," wherein a pivoted swinging or throwing arm is employed to project the target into the air to be shot at by marksmen.

The object of the invention is to produce a trap capable of giving a more even flight to the target than is attained from the traps now in use by imparting to the target as it leaves the trap an impulse or motion independent of that which it receives from the throwing-arm thereof; and the invention consists in providing the end of the swinging or throwing arm with a device for holding the target during the swing or throw of the arm; in securing this device to the arm so as to permit an independent rotary movement of the device on the arm, and in providing automatic means or mechanism on the throwing-arm for releasing the target.

The invention will be better understood by reference to the accompanying drawings, which form a part of this specification, in which similar letters of reference indicate like parts.

In the drawings, Figure 1 is a perspective view of a target-throwing device having one form of the new target-holding plate or clip applied thereto, showing in full lines the target-holding plate or clip in the position it occupies when the target is placed on the trap ready to be thrown, and in dotted lines the position it assumes at the time of releasing the target. Fig. 2 is a sectional elevation of the outer end of the throwing-arm, showing the construction and arrangement of the clip. Figs. 3 and 4 show, respectively, in plan and side elevation a modified form of clip wherein a spring is used. Fig. 5 shows in side elevation another form of clip wherein a spring is used. Fig. 6 is a perspective view of a clip arranged without a spring, and Fig. 7 is a perspective view of a clip for throwing glass balls or other targets having small orifices.

The letter A represents the throwing arm of the trap, to the outer end of which the new clip B is pivoted or hinged. The arm A is secured to the pulley C, which is operated by pulling on the cord D, so as to rapidly swing the arm A from the position shown in full lines in Fig. 1 (where it is retained by the tension-spring E when the trap is "set") to the position illustrated in dotted lines in said Fig. 1. The clip B is composed of the bent plate $a$, which carries the rubber block $b$, and is secured by the pivot or pin $a'$ to the upper end of the tongue $c$, so as to easily swing or turn thereon. The tongue $c$ is pivoted or hinged in the slot $a^3$ in the end of the arm A by the pin $c'$. The bent end $f'$ of the friction-spring $f$ presses against the lower and pointed end of the tongue $c$, and the screw $g$ regulates the tension thereon. The arm A′ is secured rigidly to the standard $A^2$ of the trap, and is provided with weighted portion $a^4$, having a projecting lip, $a^5$, against which the targets are placed when "setting" the trap. The spring E is secured to the arm A so as to engage the pin or lug $a^2$ on the arm A.

To set the trap, the clip or holder B is brought in the position illustrated in Fig. 1, the tongue $c$ turning vertically on its hinge pin or pivot $c'$, and the plate $a$ is swung around on the pivot $a'$, so as to bring the rubber block parallel to the arm A. The arm A is now set—that is, swung back—so that the lug or pin $a^2$ thereof will engage the spring E. The target F, which is usually cup or dish shaped, (shown in the drawings in dotted lines in Fig. 1,) will then be placed on the weighted portion $a^4$ of the arm A against the lip $a^5$, and over the block $b$ of the clip B.

The target is thrown by pulling on the cord D, which causes the arm A to disengage the spring E and to swing around to the position illustrated in dotted lines in Fig. 1, where it will be suddenly stopped by the reverse action of the cord upon the pulley C. As the arm swings around, the target F will be carried with it, being held by the clip B. The centrifugal force of the target, imparted by the rapid swinging of the arm A, causes the plate $a$ to turn on the pivot $a'$ as the arm A proceeds until the direction of the centrifugal force comes in line with the slot $a^3$ in the end of the arm A, whereupon by the sudden stopping of the arm the lower end of the tongue $c$ will be forced past the friction-spring $f$, and, turning on its hinge or pivot $c'$, will permit the clip B to drop down into the position illustrated in full lines in Fig. 2 and in dotted lines in Fig. 1, and thus release the target. The slot $a^3$ being in the line of the length of the arm A, it will be seen that the clip B will not release the target until the arm A reaches the end of its swing or throw, so that the target will receive all the propulsive force of the rapid swinging of the arm, save that which is lost by overcoming the friction of the spring $f$.

In the form of clip shown in Figs. 3 and 4, instead of pivoting the main plate $a$ to the tongue $c$ and providing the plate with a block of rubber, the plate $a$ is attached rigidly to the tongue $c$ and the button $d$ is pivoted on the plate $a$ at $a'$, which button turns with the centrifugal force exerted and releases the target at the proper time by the dropping of the main plate to an inclined position at the end of the throw or swing of the arm A, the tongue $c$ turning in the slot $a^3$ against the spring $f$, as in the forms of clip described and shown in Figs. 1 and 2. In place of the button $d$, a plain stud might be used with good results; but with the button there is no danger of breaking the rim of the target, as might be the case with the stud.

In the form of clip shown in Fig. 5 the target is held to the throwing-arm A by the plate $h$, attached to the upper end of the bolt $h'$, so as to turn or swing thereon. This bolt passes through the slot $a^4$ in the end of the arm A, and has a coiled spring, $i$, placed upon it, so as to act between the under side of the arm A and the nut $i'$ on the lower end of the said bolt $h'$. In the upper part of the arm A is the transverse slot $a^5$, into which the spring $i$ suddenly draws the plate $h$ when the target is to be released. In setting this form of clip the plate $h$ will be lifted out of the slot $a^3$ against the tension of the spring $i$ and turned across the transverse slot $a^5$ parallel with the length of the arm A, as shown, and the target will be placed over the plate $h$, as over the button $d$ and block $b$ in the forms of clips above described. As the arm A swings around, the centrifugal force of the target will turn the plate $h$ until it comes parallel with the slot $a^3$, whereupon the spring $i$ will draw it quickly into the slot $a^3$, and thus release the target.

In the form of clip illustrated in Fig. 6 the plate $a$ is pivoted by the pin $a'$ directly to the end of the arm A, and to this plate $a$ is hinged at $e'$ the bent plate $e$, which carries the block $b$, over which the target is placed, as in the form first above mentioned. To the under side of the arm A is secured a plate provided with a slot coinciding with the slot $a^3$ in the arm A. The edge of the plate which projects beyond the sides and end of the arm A is made rounding, as shown at $a^6$, and the under side of the bent plate $e$ is provided with a tongue or projection, $e^2$, which rests against the outer edge, $a^6$, of the plate, as shown, and thus holds the bent plate $e$ and the rubber block $b$ in position parallel with the arm A for receiving and holding the target. The target to be thrown will be placed, as in the other forms, over the block $b$, which will hold the target until by centrifugal force the plates $a$ and $e$ are swung around in line with the slot $a^3$, whereupon the toe or projection $e^2$ will drop into the slot W and permit the plate $a$ and block $b$ to drop back into the inclined position, and thus release the target.

The form of clip illustrated in Fig. 7 is designed for glass balls or other targets having small orifices, and is substantially like the form last described, with this exception, viz: The plate $e$ is made smaller, the rubber block is not used, and in its place is used the pin $j$, adapted to fit into the small orifices or openings in glass balls or other targets. The operation of this form is similar to that just described.

Having described the invention, what I claim as the invention of the said CHARLES F. STOCK is as follows:

1. The combination, with the throwing-arm of a target-throwing device, of a clip for holding the target, arranged to automatically drop below the surface of the throwing-arm for releasing the target, substantially as described.

2. The target-holding clip consisting of the plate $a$, having the plate $e$, provided with the toe $e^2$ hinged to it, in combination with the slotted plate $a^6$, all adapted to be operated substantially as described.

3. In a trap or sending apparatus for flying targets, a throwing-arm provided with a pivoted extension or target-carrier which by the motion and arrest of the arm is independently rotated on its pivot by centrifugal force into a position elongating said arm to project the target, substantially as specified.

4. In a trap or sending apparatus for flying targets, a sending or throwing arm having a pivoted clip carrying the target, said arm being provided with means for automatically releasing the target at the extreme extension of the arm, as and for the purpose specified.

N. GRIER MOORE,
*Administrator of the estate of Charles F. Stock, deceased.*

Witnesses:
FRANK JACK,
W. E. COE.